United States Patent
Kim et al.

(10) Patent No.: US 11,914,026 B2
(45) Date of Patent: Feb. 27, 2024

(54) RADAR IMAGE GENERATION MEHTOD AND APPARATUS FOR PERFORMING THE SAME

(71) Applicants: ELECTRONICS AND TELECOMMUNICATIONS RESEARCH INSTITUTE, Daejeon (KR); Pukyong National University Industry-University Cooperation Foundation, Busan (KR)

(72) Inventors: Hyungju Kim, Daejeon (KR); Sunghyun Hwang, Daejeon (KR); Sungjin Yoo, Daejeon (KR); Woo Jin Byun, Daejeon (KR); Jaehyun Park, Busan (KR); Jiho Seo, Busan (KR); Jonghyeok Lee, Busan (KR); Yong-Gi Hong, Busan (KR); Seongjun Hwang, Busan (KR)

(73) Assignees: ELECTRONICS AND TELECOMMUNICATIONS RESEARCH INSTITUTE, Daejeon (KR); PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 333 days.

(21) Appl. No.: 17/194,732

(22) Filed: Mar. 8, 2021

(65) Prior Publication Data
US 2021/0286069 A1    Sep. 16, 2021

(30) Foreign Application Priority Data
Mar. 12, 2020 (KR) .......................... 10-2020-0030606

(51) Int. Cl.
*G01S 13/89* (2006.01)
*G01S 13/42* (2006.01)
(Continued)

(52) U.S. Cl.
CPC .............. *G01S 13/89* (2013.01); *G01S 13/42* (2013.01); *G01S 13/72* (2013.01); *G01S 13/87* (2013.01); *G01S 13/931* (2013.01)

(58) Field of Classification Search
CPC .......... G01S 13/89; G01S 13/42; G01S 13/72; G01S 13/87; G01S 13/931; G01S 13/343; G06T 2207/10044
See application file for complete search history.

(56) References Cited

U.S. PATENT DOCUMENTS

2014/0327566 A1* 11/2014 Burgio .................. G01S 13/343
                                                            342/108
2018/0316095 A1    11/2018 Kang et al.
(Continued)

FOREIGN PATENT DOCUMENTS

| JP | 2007-132906 A | 5/2007 |
| JP | 2011-085596 A | 4/2011 |
| KR | 10-1551824 B1 | 9/2015 |
| KR | 10-1703773 B1 | 2/2017 |
| KR | 10-2026958 B1 | 9/2019 |

OTHER PUBLICATIONS

Hyukjung Lee et al., "Forward-Looking Super-Resolution Radar Imaging via Reweighted L1-Minimization", IEEE Radar Conference, 2018.
(Continued)

*Primary Examiner* — Donald H B Braswell
(74) *Attorney, Agent, or Firm* — LRK PATENT LAW FIRM

(57) ABSTRACT

Disclosed are a radar image generation method and an apparatus for performing the same. The radar image generation method includes receiving a received signal received
(Continued)

at each of radars that are distributed and arranged; generating an input signal by processing the received signal; generating a support vector based on the input signal; updating the support vector; updating a coefficient corresponding to the support vector; and generating a radar image based on the support vector and the coefficient.

18 Claims, 12 Drawing Sheets

(51) Int. Cl.
  *G01S 13/72* (2006.01)
  *G01S 13/87* (2006.01)
  *G01S 13/931* (2020.01)

(56) References Cited

U.S. PATENT DOCUMENTS

| | | |
|---|---|---|
| 2019/0089470 A1 | 3/2019 | Kim et al. |
| 2019/0310360 A1* | 10/2019 | Hershkowitz ........... G01S 7/356 |
| 2020/0124716 A1* | 4/2020 | Millar .................. G01S 13/726 |
| 2020/0174096 A1* | 6/2020 | Cho ........................ G01S 7/354 |
| 2022/0317288 A1* | 10/2022 | Goda .................... G01S 13/931 |
| 2022/0327360 A1* | 10/2022 | Merlin ................ H04W 64/006 |

OTHER PUBLICATIONS

Jiho Seo et al., "Bayesian Matching Pursuit Based Distributed FMCW MIMO Radar Imaging", IEEE 2020.

\* cited by examiner

Algorithm 1 BCS for radar imaging

1: $S^{(0)} \leftarrow \{0_{PR}\}$, $\overline{S}^{(0)} \leftarrow \{0_{PR}\}$

2: $\hat{x}^{(0)} \leftarrow 0_{PR}$, $\varepsilon^{(0)} \leftarrow \| y - A\hat{x}^{(0)} \|^2$ 3: $i \leftarrow 1$ 4: while $\varepsilon^{(i-1)} < \varepsilon_{th}$ do 5: Construct possible support vector set $\overline{S}^{(i)}$ by activating one element of vector of $\overline{S}^{(i-1)}$ 6: $\mu^i(s_k) \leftarrow -MN \ln \pi - \ln \det(\Phi(s)) - y^H \Phi^{-1}(s_k)y$, $s_k \in S^{(i)}$ 7: Store $s_k$ associated with D largest $\mu^{(i)}(s_k)$ in $\overline{S}^{(i)}$ 8: $\hat{x}^{(i)} \leftarrow (\sigma_n^2 R^{-1}(\tilde{s}) + A_{\tilde{s}}^H A_{\tilde{s}})^{-1} A_{\tilde{s}}^H y$, Here, $A_{\tilde{s}} = A\,diag\{\tilde{s}\}$ and $\tilde{s}$ is associated with D largest value of $\mu^{(i)}(s_k)$ 9: $\varepsilon^{(i)} \leftarrow \| y - A\hat{x}^{(i)} \|^2$ 10: $i \leftarrow i+1$ 11: end while 12: Return $\tilde{s}, \hat{x}^{(i)}$

FIG. 5

Algorithm 2 DBCS for radar imaging

1: $S^{(0)} \leftarrow \{0_{PR}\}, \quad \overline{S}^{(0)} \leftarrow \{0_{PR}\}$ 2: $\hat{x}^{(0)} \leftarrow 0_{PR}, \quad \epsilon^{(0)} \leftarrow \|y - A\hat{x}^{(0)}\|^2$ 3: $i \leftarrow 1$.

4: while $\epsilon^{(i-1)} < \epsilon_{th}$ do

5: lth radar (l=1... L)

6: Construct possible support vector set $S^{(i)}$ by activating one element of vector of $\overline{S}^{(i-1)}$ 7: $\mu^{(i)} \leftarrow -MN \ln \pi - \ln \det(\Phi(s_k)) - y^H \Phi^{-1}(s_k) y \quad s_k \in S^{(i)}$ 8: Reference radar:

9: $\mu^{(i)}(s_k) = \sum_{l=1}^{L} \mu^{(i,l)}(s_k)$

10: Store $s_k$ associated with D largest $\mu^{(i)}(s_k)$ in $\overline{S}^{(i)}$ and share $\overline{S}^{(i)}$ with all radars.

11: lth radar (l=1... L)

12: $\hat{x}^{(i,l)} \leftarrow = (\sigma_n^2 R^{-1}(\tilde{s}) + (\overline{A}_{\tilde{s}}^{(l)})^H \overline{A}_{\tilde{s}}^{(l)})^{-1} (\overline{A}_{\tilde{s}}^{(l)})^H y^{(l)}$ Here, $\overline{A}_{\tilde{s}}^{(l)} = \overline{A}^{(l)} diag\{\tilde{s}\}$ and $\tilde{s}$ is associated with D largest value of $\mu^{(i)}(s_k)$ 13: Reference radar :

14: $\epsilon^{(i)} \leftarrow \|y - A\hat{x}^{(i,1)}\|^2$

15: $i \leftarrow i + 1$

16: end while

17: $\hat{x} \leftarrow \sum_{l=1}^{L} \alpha_l \hat{x}^{(i,l)} \quad \alpha_l = \frac{\mu^{(i,l)}(\tilde{s})}{\sum_{l=1}^{L} \mu^{(i,l)}(\tilde{s})}$ 12: Return $\tilde{s}, \hat{x}$

FIG. 7

Back-projection method

OMP

BMP

DBMP with L = 2

RADAR IMAGE GENERATION MEHTOD AND APPARATUS FOR PERFORMING THE SAME

CROSS-REFERENCE TO RELATED APPLICATION(S)

This application claims the priority benefit of Korean Patent Application No. 10-2020-0030606, filed on Mar. 12, 2020, in the Korean Intellectual Property Office, the disclosure of which is incorporated herein by reference for all purposes.

BACKGROUND

1. Field of the Invention

One or more example embodiments relate to a radar image generation method and an apparatus for performing the same.

2. Description of Related Art

Radars for vehicular and military purposes need to acquire high-resolution radar images capable of determining a distance and an azimuth of a target to estimate an accurate position of the target. In particular, in application fields, such as autonomous driving, a radar image in front needs to be acquired at a very fast real-time processing speed. Although a two-dimensional (2D) multiple signal classification (MUSIC) algorithm is widely used to acquire such a ultra-high resolution image, the 2D MUSIC algorithm is vulnerable to high computational complexity and noise and there are many restrictions on being applied to application fields, such as autonomous driving.

A Nyquist sampling method refers to technology for acquiring an analog signal in a digital device. According to the Nyquist sampling method, sampling needs to be performed at a frequency of at least twice a frequency bandwidth of a corresponding analog signal to completely restore an analog signal. The Nyquist sampling method is concise and clear, which corresponds to a sufficient condition to completely restore a signal. Therefore, the Nyquist sampling method does not apply a signal characteristic.

Compression sensing refers to technology for acquiring and reconstructing a signal based on conventional knowledge that a signal is sparse or compressible. Using compression sensing theory, a signal may be sampled at a much slower speed than that of the Nyquist sampling method. Compression sensing is used for various applications including data compression and magnetic resonance imaging (MRI).

SUMMARY

At least one example embodiment provides technology for acquiring a high-resolution radar image by applying compression sensing to a signal received through a radar.

At least one example embodiment also provides a compression sensing algorithm for converting a signal received through a radar and generating a radar image based on the converted signal.

According to an aspect of at least one example embodiment, there is provided a radar image generation method including receiving, as an input signal, a signal received at each of radars that are distributed and arranged; generating a support vector based on the input signal; updating the support vector; updating a coefficient corresponding to the support vector; and generating a radar image based on the support vector and the coefficient.

The coefficient may be a total sum of an antenna gain and a pathloss of a radar.

The updating of the support vector may include computing a support update matrix for updating the support vector; and sharing a support vector set that is updated based on the support update matrix.

The computing of the support update matrix may include initializing the support vector; and computing the support update matrix by activating a single element of the support vector.

The sharing of the support vector set may include updating the support vector set based on a total sum of the support update matrix; and sharing the updated support vector set.

The updating of the support vector set may include storing a support vector associated with a maximum value of the total sum in the support vector set.

The updating of the coefficient may include computing the coefficient based on the updated support vector; and verifying whether an estimation error is less than a threshold based on the coefficient.

According to an aspect of at least one example embodiment, there is provided a radar image generation apparatus including a memory configured to store instructions; and a processor configured to execute the instructions. When the instructions are executed by the processor, the processor is configured to receive, as an input signal, a signal received at each of radars that are distributed and arranged, to generate a support vector based on the input signal, to update the support vector, to update a coefficient corresponding to the support vector, and to generate a radar image based on the support vector and the coefficient.

The coefficient may be a total sum of an antenna gain and a pathloss of a radar.

The processor may be configured to compute a support update matrix for updating the support vector, and to share a support vector set that is updated based on the support update matrix.

The processor may be configured to initialize the support vector, and to compute the support update matrix by activating a single element of the support vector.

The processor may be configured to update the support vector set based on a total sum of the support update matrix, and to share the updated support vector set.

The processor may be configured to store a support vector associated with a maximum value of the total sum in the support vector set.

The processor may be configured to compute the coefficient based on the updated support vector, and to verify whether an estimation error is less than a threshold based on the coefficient.

According to an aspect of at least one example embodiment, there is provided a radar system including a plurality of radars each including a plurality of transmit antennas and a plurality of receive antennas; and a radar image generation apparatus.

The plurality of radars may be provided at distributed positions.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appre

FIG. 5 illustrates an example of a radar image generation operation of the radar image generation apparatus of FIG. 2;

FIG. 7 illustrates another example of the radar image generation operation of the radar image generation apparatus of FIG. 2;

DETAILED DESCRIPTION

Figure 1:
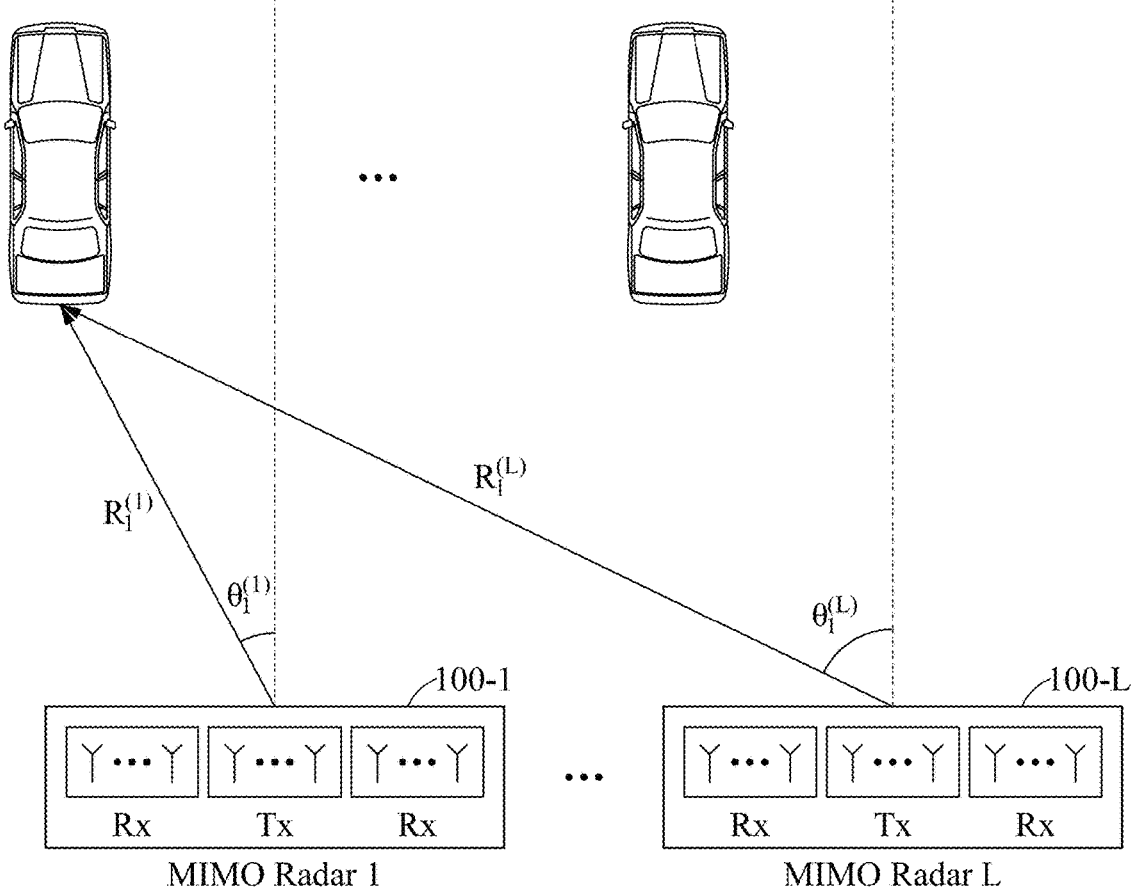
- FIG. 1 illustrates an example of a radar system according to an example embodiment.

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components and the components are not limited by the terms. Each of these terminologies is not used to define an essence, order or sequence of a corresponding component but used merely to distinguish the corresponding component from other component(s). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 2:
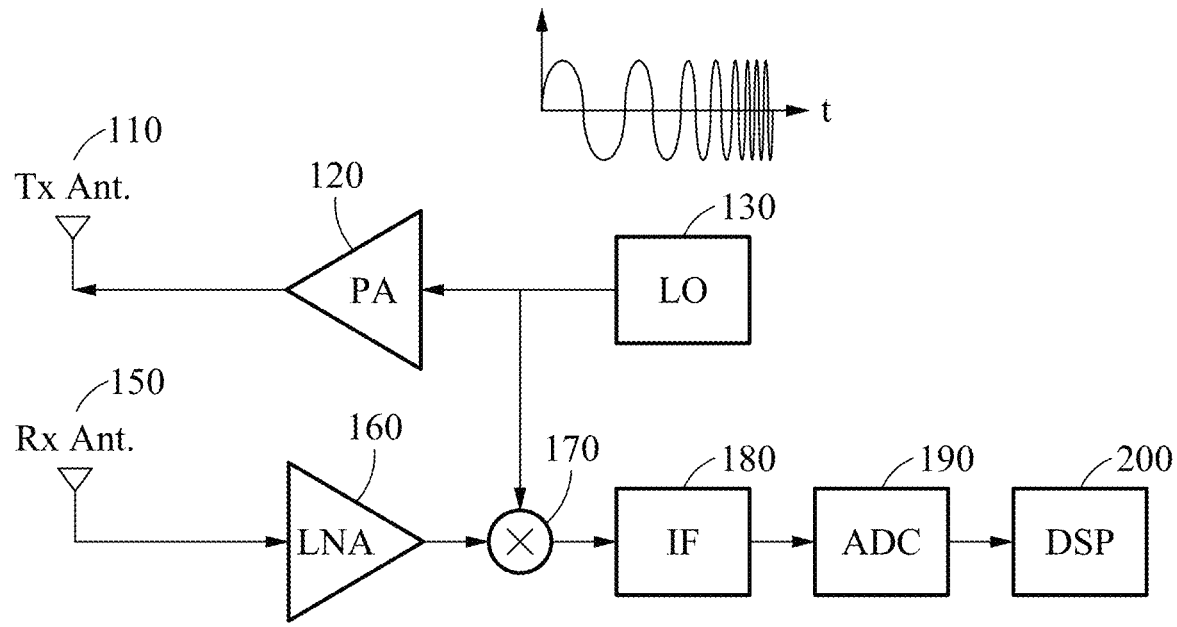
FIG. 2 illustrates an example of a radar of FIG. 1.

FIG. 1 illustrates an example of a radar system according to an example embodiment, and FIG. 2 illustrates an example of a radar of FIG. 1.

A radar system 10 may generate a radar image that represents a position of each of targets 50-1 to 50-K. For example, the radar system 10 may generate a radar image by applying compression sensing technology.

The radar system 10 may be, for example, a frequency modulated continuous wave (FMCW) multiple input multiple output (MIMO) radar system.

The radar system 10 may include a plurality of radars 100-1 to 100-L. For example, the radar system 10 may include the plurality of radars 100-1 to 100-L that are distributed. The plurality of radars 100-1 to 100-L may be FMCW MIMO radars. Although FIG. 1 illustrates that the radar system 10 includes L radars 100-1 to 100-L, it is provided as an example only. The radar system 10 may include at least one of the radars 100-1 to 100-L.

The radar system 10 may convert received signals of the plurality of radars 100-1 to 100-L to signals suitable for applying compression sensing. For example, the radar system 10 may convert the received signals of the distributed plurality of radars 100-1 to 100-L.

The radar system 10 may generate a radar image based on a received signal by applying a compression sensing algorithm. For example, the radar system 10 may generate the radar image using a distributed compression sensing algorithm.

The plurality of radars 100-1 to 100-L may have the same configuration. FIG. 2 illustrates a single radar 100 corresponding to one of the plurality of radars 100-1 to 100-L included in the radar system 10, as an example. Description related to the radar 100 may apply to each of the plurality of radars 100-1 to 100-L.

The radar 100 may include a transmit antenna (Tx antenna) 110, a first amplifier 120, for example, a power amplifier (PA), an oscillator 130, a receive antenna (Rx antenna) 150, a second amplifier 160, for example, a low noise amplifier (LNA), a mixer 170, a bandpass filter 180, for example, an intermediate frequency (IF) filter an analog-to-digital converter (ADC) 190, and a radar image generation apparatus 200, for example, a digital signal processor (DSP).

Although FIG. 2 illustrates a single Tx antenna 110 and a single Rx antenna 150 for clarity of description, the radar 100 may include a plurality of Tx antennas 110 and a plurality of Rx antennas 150.

The Tx antennas 110 of the radar 100 may be linearly separated and arranged at intervals of dt and the Rx antennas 150 of the radar 100 may be linearly separated and arranged at intervals of dr.

The radar 100 may receive a signal transmitted through the Tx antenna 110 and reflected from a corresponding target, for example, one of the targets 50-1 to 50-K of FIG. 1 (hereinafter, the target (50-1 to 50-K)), and thereby returned using the Rx antenna 150.

The radar 100 may approximate a path in which a signal propagation path from the Tx antenna 110 to the target (50-1 to 50-K) and a reflection path from the target (50-1 to 50-K) to the Rx antenna 150 are added as a round-trip path between a virtual position that is in the middle of the Tx antenna 110 and the Rx antenna 150 and the target (50-1 to 50-K). That is, the radar 100 may assume that the Tx antenna 110 and the Rx antenna 150 are present at the same position and a virtual antenna is present at the virtual position.

A transmission FMCW signal $s_{m_t}^{(l)}(t)$ transmitted from the $m_t^{th}$ Tx antenna 110 of an $l^{th}$ radar 100-1 may be represented as Equation 1.

$$s_{m_t}^{(l)}(t) = \exp\{j(2\pi(f_c + \Delta f_c(m_t-1) + \Delta f_d(l-1))t + \pi k t^2)\},$$
$$0 \leq t \leq T_{PR} \quad \text{[Equation 1]}$$

In Equation 1, $f_c$, $\Delta f_c$, and $\Delta f_d$ denote a reference frequency, a frequency variation according to the Tx antenna 110, and a frequency variation according to the radar 100, respectively.

A received signal $r_{m_r}^{(l)}(t)$ that is received at the $m_r^{th}$ Rx antenna 150 of the $l^{th}$ radar 100-1 by reflecting a transmission signal $s_{m_t}^{(l)}(t)$ from a $K^{th}$ target, that is, the target 50-K may be represented as Equation 2.

$$r_{m_r}^{(l)}(t) = \sum_{k=1}^{K} \sum_{m_t=1}^{M_t} \gamma_k^{(l)} s_{m_t}^{(l)}\left(t - \tau_{m_r m_t k}^{(l)}\right) + n_{m_r}^{(l)'}(t) \quad \text{[Equation 2]}$$

In Equation 2, $\gamma_k^{(l)}$ denotes a reflection coefficient of the transmission signal $s_{m_t}^{(l)}(t)$ that is reflected from the $K^{th}$ target, that is, the target 50-K, $n_{m_r}^{(l)'}(t)$ denotes additive white Gaussian noise (AWGN) of the myth Rx antenna 150 of the $l^{th}$ radar 100-1, and $\tau_{m_r m_t k}^{(l)}$ denotes a time delay, that is, an amount of time used for the transmission signal $s_{m_t}^{(l)}(t)$ transmitted from the $m_t^{th}$ Tx antenna 110 of the $l^{th}$ radar 100-1 to be reflected from the $K^{th}$ target, that is, the target 50-K, and received at the $m_r^{th}$ Rx antenna 150 of the $l^{th}$ radar 100-1.

The time delay $\tau_{m_r m_t k}^{(l)}$ may be represented as Equation 3.

$$\tau_{m_r m_t k}^{(l)} = \quad \text{[Equation 3]}$$
$$\frac{2}{c}\left(\frac{R_{m_{tk}}^{(l)} + R_{m_{rk}}^{(l)}}{2} + \frac{v_k^{(l)}}{2}t\right) \approx \frac{2}{c}\left(R_{0k}^{(l)} + \frac{x_{0m_t} + x_{0m_r}}{2}\sin\theta_k^{(l)} + \frac{v_k^{(l)}}{2}t\right)$$

In Equation 3, $v_k^{(l)}$ and $\theta_k^{(l)}$ denote a relative velocity and an azimuth of the $K^{th}$ target, that is, the target 50-K, with respect to the $l^{th}$ radar 100-1, respectively.

$R_{m_{tk}}^{(l)}$ denotes a distance from the $m_t^{th}$ Tx antenna 110 of the $l^{th}$ radar 100-1 to the $K^{th}$ target, that is, the target 50-K and $R_{m_{rk}}^{(l)}$ denotes a distance from the $K^{th}$ target, that is, the target 50-K, to the $m_r^{th}$ Rx antenna 150 of the $l^{th}$ radar 100-1.

The Tx antenna 110 and the Rx antenna 150 may be assumed as virtual antennas that are present at the same virtual position. Therefore, $R_{m_{tk}}^{(l)}$ and $R_{m_{rk}}^{(l)}$ may be approximated to $R_{0k}^{(l)}$ that is a distance between the virtual antenna and the $K^{th}$ target, that is, the target 50-K.

$x_{0m_t}$ and $x_{0m_r}$ denote relative positions of the $m_t^{th}$ Tx antenna 110 and the $m_r^{th}$ Rx antenna 150 for a reference position of the $l^{th}$ radar 100-1, respectively.

The radar 100 may assume that the Tx antenna 110 and the Rx antenna 150 are present to form a linear array with an interval of $$\lambda/2$$

between the virtual antennas without most losses. Here, $\lambda$ denotes a wavelength of an FMCW waveform.

The radar 100 may generate a de-ramped signal $y_m^{(l)}(t)$ by multiplying a signal $r_{m_r}^{(l)}(t)$ received through the mixer 170 by the transmission signal $s_{m_t}^{(l)}(t)$ and allowing the same to pass the bandpass filter 180. The de-ramped signal $y_m^{(l)}(t)$ may be represented as Equation 4.

$$y_m^{(l)}(t) = LPr_{m_r}^{(l)*}(t)s_{m_t}^{(l)}(t) \approx \quad \text{[Equation 4]}$$
$$\sum_{k=1}^{K} \gamma_k^{(l)} \exp\{j(2\pi f_c \tau_{mk}^{(l)} + 2\pi k \tau_{mk}^{(l)} t - \pi k (\tau_{mk}^{(l)})^2)\} + n_m^{(l)}(t),$$
$$n_m^{(l)}(t) \sim CN(0, \sigma_n^2)$$

The radar 100 may sample the de-ramped signal $y_m^{(l)}(t)$ through the ADC 190. For example, the ADC 190 may generate a sampled signal $y_m^{(l)}[n]$ by sampling the de-ramped signal $y_m^{(l)}(t)$ at a sampling frequency of $$f_s = \frac{1}{\tau_s}.$$

The sampled signal $y_m^{(l)}[n]$ may be represented as Equation 5.

$$y_m^{(l)}[n] = \quad \text{[Equation 5]}$$
$$y_m^{(l)}(nT_s) \approx \sum_{k=1}^{K} \gamma_k^{(l)} \exp\left\{j4\pi f_c\left(\frac{R_{0k}^{(l)}}{c} + \frac{1}{c}(d(m-1)\sin\theta_k^{(l)})\right) + j4\pi k\left(\frac{R_{0k}^{(l)}}{c} + \frac{1}{c}(d(m-1)\sin\theta_k^{(l)})nT_s\right)\right\} + n_m^{(l)}[n]$$

For clarity of description, the sampled signal $y_m^{(l)}[n]$ generated by sampling the de-ramped signal $y_m^{(l)}(t)$ is referred to as a de-ramped signal $y_m^{(l)}[n]$.

The de-ramped signal $y_m^{(l)}[n]$ includes distance and azimuth information of the K targets 50-1 to 50-K. Therefore, a two-dimensional (2D) multiple signal classification (MUSIC) algorithm may be applied to generate a high-resolution radar image.

The radar image generation apparatus 200 may apply a compression sensing algorithm to the de-ramped signal $y_m^{(l)}[n]$. Hereinafter, a signal conversion method for generating a radar image using the radar image generation apparatus 200 is further described with reference to FIGS. 3 and 4.

Figure 3:
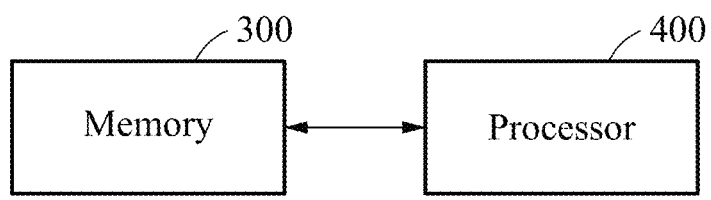
FIG. 3 is a diagram illustrating an example of a radar image generation apparatus of FIG. 2.
Figure 4:
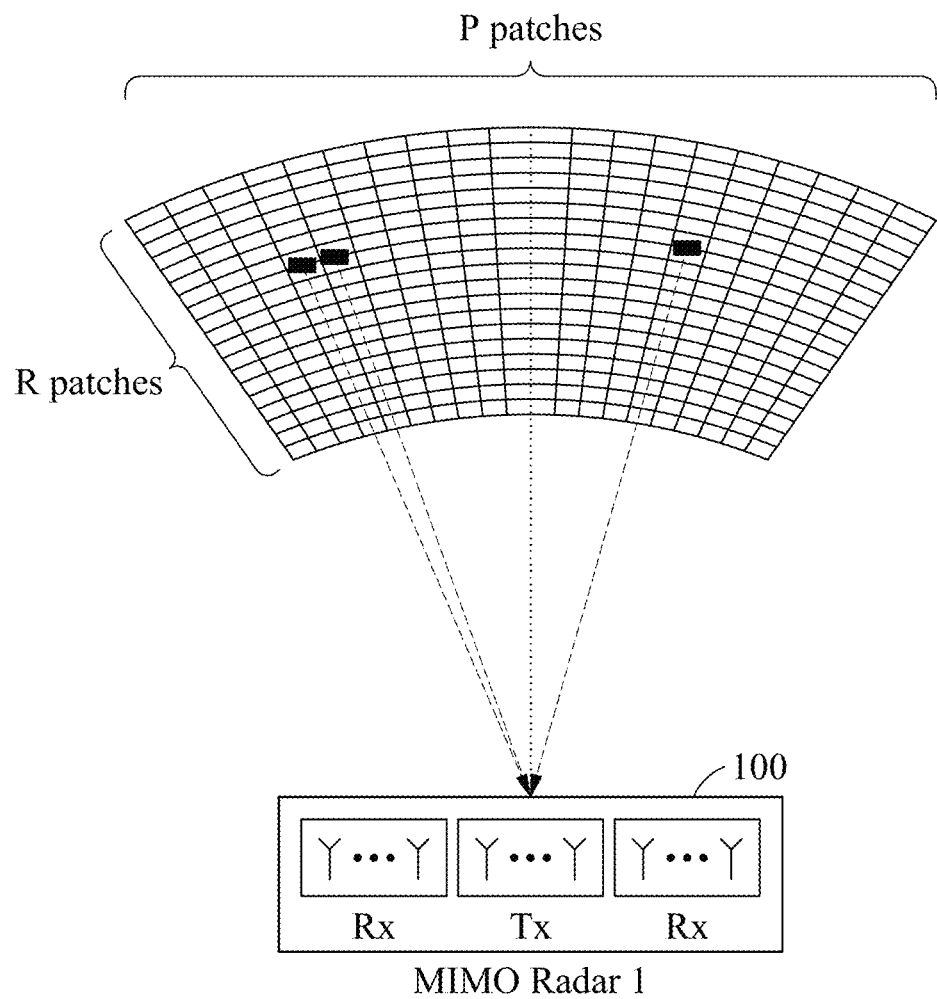
FIG. 4 illustrates an example of a signal processing operation of the radar image generation apparatus of FIG. 2.

FIG. 3 is a diagram illustrating a radar image generation apparatus of FIG. 2, and FIG. 4 illustrates an example of a signal processing operation of the radar image generation apparatus of FIG. 2.

The radar image generation apparatus 200 may be implemented as, for example, a digital signal processor (DSP).

Referring to FIG. 3, the radar image generation apparatus 200 may include a memory 300 and a processor 400.

The memory 300 may store instructions or a program executable by the processor 400. For example, the instructions may include instructions for executing an operation of the processor 400 and/or an operation of each configuration of the processor 400.

The processor 400 may process data stored in the memory 300. The processor 400 may execute a computer-readable code, for example, software, stored in the memory 300 and instructions triggered by the processor 400.

The processor 400 may be a hardware-implemented data processing device having circuitry in a physical structure to perform desired operations. For example, the desired operations may include a code or instructions included in a program.

For example, the hardware-implemented data processing device may include a microprocessor, a central processing unit, a processor core, a multi-core processor, a multiprocessor, an application-specific integrated circuit (ASIC), and a field programmable gate array (FPGA).

The radar image generation apparatus 200 may set a measurement area for applying compression sensing. For example, the radar image generation apparatus 200 may set the measurement area by dividing the measurement area in an R×P (distance×azimuth) 2D patch form.

The radar image generation apparatus 200 may perform signal conversion for applying a compression sensing algorithm, for example, Bayesian matching pursuit (BMP) and/ distributed compression sensing algorithm, for example, distributed Bayesian matching pursuit (DBMP).

The radar image generation apparatus 200 may reformulate the de-ramped signal $y_m^{(l)}[n]$ of Equation 5 to be represented as Equation 6 based on the measurement area. For example, the radar image generation apparatus 200 may reformate the de-ramped signal $y_m^{(l)}[n]$ to be represented as Equation 6 based on the measurement area that is divided in a patch form.

$$y_m^{(l)}[n] \approx \sum_{p=1}^{P}\sum_{r=1}^{R} x^{(l)}(r,p) \exp\left\{j4\pi f_c\left(\frac{R_{0k}^{(l)}}{c} + \frac{1}{c}(d(m-1)\sin\theta_k^{(l)})\right) + j4\pi k\left(\frac{R_{0k}^{(l)}}{c} + \frac{1}{c}(d(m-1)\sin\theta_k^{(l)})nT_s\right)\right\} + n_m^{(l)}[n]$$

[Equation 6]

Here, $R_r^{(l)}$ and $\theta_p^{(l)}$ respectively denote a distance and an azimuth of a target of patch (r, p) with respect to the $l^{th}$ radar 100-1.

$x^{(l)}(r,p)$ denotes a coefficient that is a total sum of an antenna gain and a pathloss of the $l^{th}$ radar 100-1 and a reflection gain of the target 50 of the patch (r,p). For example, if a $k^{th}$ target 50-k is present in the patch (r,p), $x^{(l)}(r,p)=\gamma_k^{(l)}$ may be established.

The radar image generation apparatus 200 may construct a measurement vector $y^{(l)}$ based on the de-ramped signal $y_m^{(l)}[n]$ for all of virtual antennas of a radar and discrete time samples. The measurement vector $y^{(l)}$ may be represented as a matrix form of Equation 7.

$$y^{(l)}=[y_1^{(l)}[1],y_2^{(l)}[1], \ldots ,y_M^{(l)}[1],y_1^{(l)}[2], y_2^{(l)}[2], \ldots ,y_M^{(l)}[N]]^T = A^{(l)}x^{(l)}+n^{(l)}$$

[Equation 7]

Here, $A^{(l)} \in \mathbb{C}^{MN \times PR}$ may be given as Equation 8.

$$A^{(l)} = \begin{bmatrix} A(1,1,R_1^{(l)},\theta_1^{(l)}) & A(1,1,R_1^{(l)},\theta_2^{(l)}) & \ldots & A(1,1,R_R^{(l)},\theta_P^{(l)}) \\ A(2,1,R_1^{(l)},\theta_1^{(l)}) & A(2,1,R_1^{(l)},\theta_2^{(l)}) & \ldots & A(2,1,R_R^{(l)},\theta_P^{(l)}) \\ \vdots & \vdots & \ddots & \vdots \\ A(M,N,R_1^{(l)},\theta_1^{(l)}) & A(M,N,R_1^{(l)},\theta_2^{(l)}) & \ldots & A(M,N,R_R^{(l)},\theta_P^{(l)}) \end{bmatrix}$$

[Equation 8]

Here, each $A(M, N, R_r^{(l)}, \theta_p^{(l)})$ may be represented as Equation 8.

$$A(M,N,R_r^{(l)},\theta_P^{(l)}) = \exp\left\{j4\pi f_c\left(\frac{R_r^{(l)}}{c} + \frac{1}{c}(d(m-1)\sin\theta_p^{(l)})\right) + j4\pi k\left(\frac{R_r^{(l)}}{c} + \frac{1}{c}(d(m-1)\sin\theta_p^{(l)})nT_s\right)\right\}$$

[Equation 9]

The radar image generation apparatus 200 may generate a radar image by estimating the measurement vector $y^{(l)}$ and a magnitude coefficient $x^{(l)}$ of a signal.

Here, a number (PR) of patches needs to be large and a total number (MN) of samples needs to be less than the number (PR) of patches such that the radar image generation apparatus 200 may acquire a high-resolution radar image. That is, PP>>MN>>1 needs to be met. Unless PR>>MN>=1 is met, Equation 7 may not be solved.

If a condition that $x^{(l)}$ is sparse and matrix $A^{(l)}$ is a restricted isometry property (RIP) is met, the radar image generation apparatus 200 may generate a radar image by solving Equation 7 using a compression sensing algorithm.

Hereinafter, a radar image generation operation using a compression sensing algorithm, for example, BMP, of the radar image generation apparatus 200 is further described.

The radar image generation apparatus 200 may receive a signal received at each of distributed radars as an input signal. For example, the radar image generation apparatus 200 may receive a signal received at each of FMCW MIMO radars as an input signal.

For clarity of description, an operation of generating, by the radar image generation apparatus 200, a radar image for a single FMCW MIMO radar is described.

Here, a measurement vector y may be represented as Equation 10.

$$y=Ax+n$$

[Equation 10]

The radar image generation apparatus 200 may generate a support vector s. For example, the radar image generation apparatus 200 may generate the support vector s with a size of PR×1 that represents sparsity for sparsity modeling. The support vector s may be represented as Equation 11.

$$s=[s(1,2),s(1,2), \ldots ,s(R,P)]^T \in \{0,1\}^{PR}.$$

[Equation 11]

In Equation 11, s(r,p) is 1 if a target is present in a distance of $R_r$ at an azimuth of $\theta_p$. and is 0 if the target is absent. That is, the support vector s may be a binary supporting vector.

A magnitude coefficient x of a signal corresponding to the support vector s follows a complex Gaussian distribution having an average of 0 and a covariance matrix R(s). That is, the support vector s and the magnitude coefficient x may meet a relationship of Equation 12.

$$x|s \sim CN(0,\Phi(s)).$$

[Equation 12]

The covariance matrix R(s) may be a diagonal matrix. For example, the covariance matrix R(s) may be represented as Equation 13.

$$R(s) = G \times \text{diag}\left\{\frac{s(1,1)}{R_1^4}, \frac{s(1,2)}{R_1^4}, \ldots, \frac{s(R,P)}{R_R^4}\right\} \quad \text{[Equation 13]}$$

A number of non-zero diagonal elements of R(s) may be equal to a number of non-zero elements of the support vector s. Since the targets 50-1 to 50-K are present in a radar image patch at the same probability, it may be assumed that the condition is established for all of r and p.

$P_s \in [0,1]$ denotes a degree of sparsity.

According to Equation 10, Equation 14 may be established.

$$y|s \sim CN(0, \Phi(s)) \quad \text{[Equation 14]}$$

In Equation 14, $\Phi(s)$ may be given as Equation 15.

$$\Phi(s) = AR(s)A^H + \sigma_n^2 I_{MN} \quad \text{[Equation 15]}$$

The radar image generation apparatus 200 may perform a compression sensing algorithm, for example, BMP, through a support update operation and a coefficient update operation.

The radar image generation apparatus 200 may perform support update and coefficient update by maximizing each of p(s|y) and p(x|y) corresponding to posterior probability.

Since Equation 16 and Equation 17 are established for all of r and p, the radar image generation apparatus 200 may define a support update matrix μ(s) as Equation 18.

$$p(x|y,s) \propto p(y|x,s)p(x|s) \quad \text{[Equation 16]}$$

$$P(s(y,p)=1) = p_z \quad \text{[Equation 17]}$$

$$\mu(s) = \ln p(y|s) = -MN \ln \pi - \ln \det(\Phi(s)) - y^H \Phi^{-1}(s)y \quad \text{[Equation 18]}$$

Since the support update matrix μ(s) is non-convex for the support vector s, the support update matrix μ(s) needs to find all the possible candidates of the support vector s to retrieve the support vector s having a maximum value, which may be computationally impossible.

The radar image generation apparatus 200 may update the support vector s based on a tree search.

Referring to FIG. 5, the radar image generation apparatus 200 may initialize the support vector s to $0_{PR}$ at a root of the tree search.

The radar image generation apparatus 200 may compute a support update matrix $\mu^1(s_k)$ by activating a single element of the support vector s using 1. Here, a possible support vector may be $s_k \in \mathbb{S}^{(1)} = \{e_1, \ldots, e_{PR}\}$ and $e_\mu$ may be an nth column of a unit matrix $I_{PR}$ with a size of PR x PR.

The radar image generation apparatus 200 may store a support vector $s_t$ associated with a D largest support update matrix $\mu^1(s_k)$ in a support vector set $\overline{\mathbb{S}}^{(1)}$.

The radar image generation apparatus 200 may activate a single element among vectors of the support vector set $\overline{\mathbb{S}}^{(1)}$ and may compute a next possible vector support vector set $\mathbb{S}^{(2)}$.

The radar image generation apparatus 200 may compute a support update matrix $\mu^2(s_k)$ for a support vector $s_k \in \mathbb{S}^{(s)}$ and may store a support vector $s_k$ associated with a largest support update matrix $\mu^2(s_k)$ in $\overline{\mathbb{S}}^{(2)}$.

The radar image generation apparatus 200 may iterate the aforementioned process until an appropriate termination criterion is met. For example, the radar image generation apparatus 200 may iterate the aforementioned process until an I element of the support vector s capable of selecting is activated.

If an estimation error $\varepsilon^{(I)}$ is less than a preset threshold $\varepsilon_{th}$, the radar image generation apparatus 200 may terminate an iteration. Here, the estimation error $\varepsilon^{(I)}$ may be represented as Equation 19.

$$\varepsilon^{(I)} \triangleq \|y - Ax^{(I)}\|_{x=s_k}^2 \quad \text{[Equation 19]}$$

Here, the support vector $s_k = \text{argmax}_{s_k} \mu^i(s_k)$ and the magnitude coefficient $x^{(i)}$. of the signal may be estimates of Equation 10.

The radar image generation apparatus 200 may perform coefficient update on the magnitude coefficient x of the signal such that p(x|y) may be maximized. The magnitude coefficient x may be represented as Equation 20.

$$x = \text{argmax}_x p(x|y) = \text{argmax}_x \sum_s p(x|y,s)p(s|y) \quad \text{[Equation 20]}$$

Here, p(x|y) may be given as Equation 21.

$$p(x|y,s) \propto p(y|x,s)p(x|s) = \frac{1}{(\pi\sigma_n^2)^{MN}\det(\pi R(s))}$$
$$\exp[-(y - A_sx)^H(y - A_sx)/\sigma_n^2]\exp[-x^H R^{-1}(s)x]. \quad \text{[Equation 21]}$$

Here, a sum of $A_s = A \text{ diag}\{s\}$ and x of Equation 18 needs to be performed for all of support vectors s and it may be computationally impossible to acquire the optimal magnitude coefficient x.

The radar image generation apparatus 200 may approximate Equation 20 to be Equation 22.

$$\hat{x} = \text{argmax}_x \sum_s p(x|y,s)p(s|y) \approx \text{argmax}_x p(x|y,\tilde{s})p(\tilde{s}|y) \quad \text{[Equation 22]}$$

In Equation 22, $p(\tilde{s}|y)$ may be independent from the magnitude coefficient x.

The radar image generation apparatus 200 may estimate a magnitude coefficient $\hat{x}$ that maximizes p(x|y) from Equation 22, as represented as Equation 23.

$$\hat{x} = (\sigma_n^2 R^{-1}(\tilde{s}) + A_{\tilde{s}}^H A_{\tilde{s}})^{-1} A_{\tilde{s}}^H y \quad \text{[Equation 23]}$$

The radar image generation apparatus 200 may generate a radar image based on the updated support vector s and magnitude coefficient $\hat{x}$.

The radar image generation operation of applying the compression sensing algorithm, for example, BMP, using the radar image generation apparatus 200 may be summarized as Algorithm 1 of FIG. 5.

Figure 6:
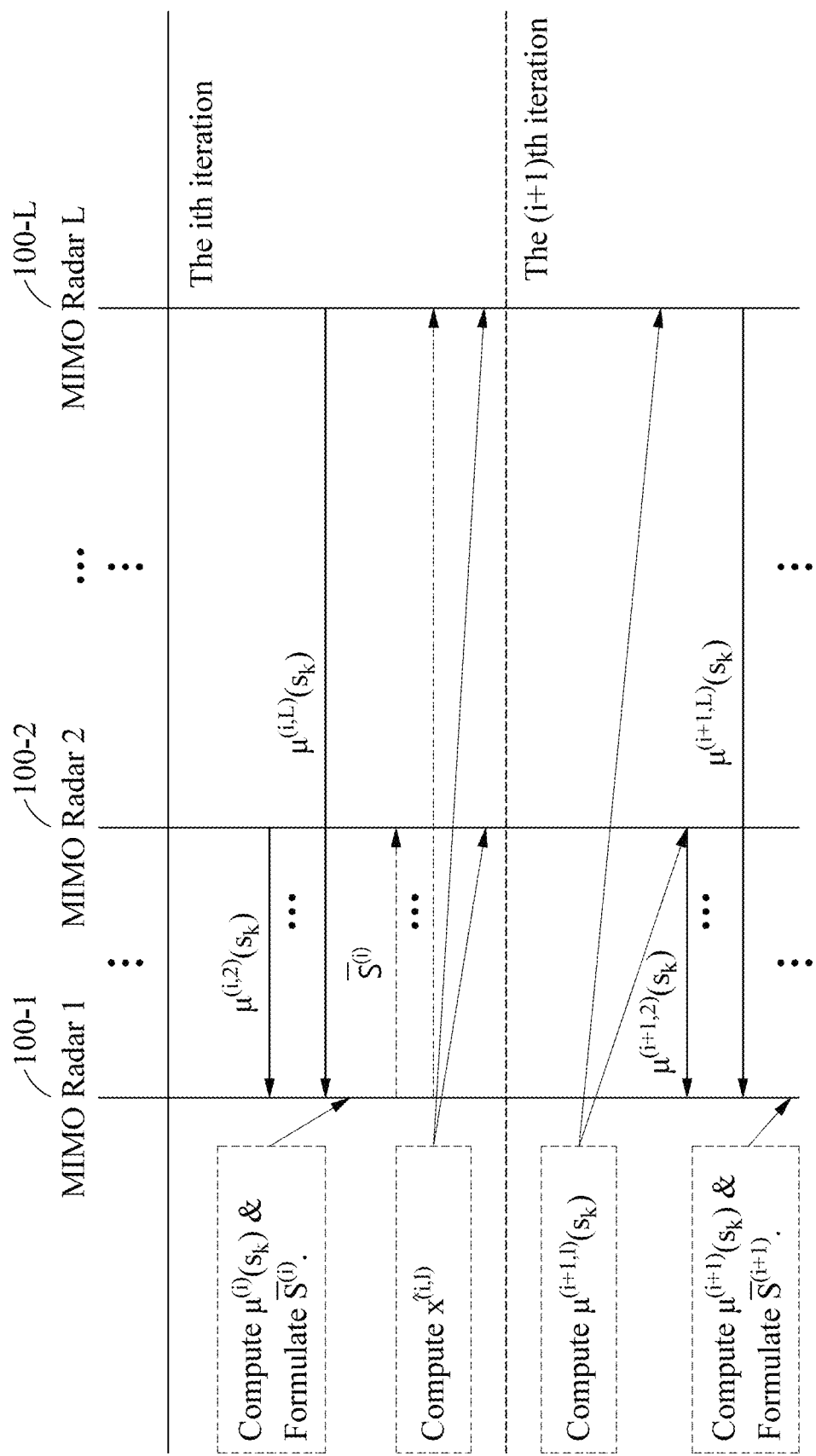
FIG. 6 illustrates another example of the radar image generation operation of the radar image generation apparatus of FIG. 2.

FIG. 6 illustrates another example of the radar image generation operation of the radar image generation apparatus of FIG. 2, and FIG. 7 illustrates another example of the radar image generation operation of the radar image generation apparatus of FIG. 2.

The radar image generation apparatus 200 may generate a radar image based on a signal received at each of distributed FMCW MIMO radars.

The radar image generation apparatus 200 may generate a radar image by applying a distributed compression sensing algorithm, for example, DBMP, to an input signal.

The radar image generation apparatus 200 may receive a distributed received signal received at each of the distributed FMCW MIMO radars, and may convert the received signal to a signal suitable for applying the distributed compression sensing algorithm, for example, DBMP, and may generate a radar image by applying the compression sensing algorithm, for example, DBMP, to the converted signal.

If there is no loss, the radar image generation apparatus 200 may generally set a first FMCW MIMO radar as a reference radar.

The radar image generation apparatus 200 may represent again Equation 7 as Equation 25 for DBCS of a distributed FMCW MIMO radar that represents a reflection coefficient $y_k^{(l)}$ as Equation 24.

$$\gamma_k^{(l)} = \frac{(R_{0k}^{(1)})^4}{(R_{0k}^{(l)})^4} \gamma_k^{(1)}, \ l = 2, \ldots, L \quad \text{[Equation 24]}$$

$$y^{(l)} = \overline{A}^{(l)} x^{(l)} + n^{(l)} \quad \text{[Equation 25]}$$

Here, $\overline{A}^{(l)} = A^{(l)} \left( \text{diag}\left\{ \left(\frac{R_1^{(1)}}{R_1^{(l)}}\right)^4, \ldots, \left(\frac{R_R^{(1)}}{R_R^{(l)}}\right)^4 \right\} \times I_p \right).$ By referring to Equation 25, the radar image generation apparatus 200 may estimate a radar image about a first radar, that is, the radar 100-1, from a received signal $y^{(l)}$ that is acquired from the lth radar 100-1. For example, by referring to Equation 25, the radar image generation apparatus 200 may estimate a magnitude coefficient x(l) from the received signal y(l) that is acquired from the $l^{th}$ radar 100-1.

Since $p(s|y^{(1)}, \ldots, y^{(L)}) \propto p(y^{(1)}, \ldots, y^{(L)}|o)p(s)$, the radar image generation apparatus 200 may define a support update matrix μ(s) as Equation 26.

$$\mu(s) = \ln p(y^{(1)}, \ldots y^{(L)} | s) = \ln \prod_{l=1}^{L} p(y^{(l)} | s) = \sum_{l=1}^{L} \mu^{(l)}(s) \quad \text{[Equation 26]}$$

Here, $\Phi^{(l)}(s) = \overline{A}^{(l)} R(s) (\overline{A}^{(l)})^H + \sigma_n^2 I_{MN}$ and $\mu(s) = -MN \ln \pi - \ln \det(\Phi^{(l)}(s)) - (y^{(l)})^H (\Phi^{(l)}(s))^{-1} y^{(l)}.$ The radar image generation apparatus 200 may determine the support vector s such that the support update matrix μ(s) may be maximized.

The radar image generation apparatus 200 may perform support update based on a tree search.

Referring to FIG. 7, the radar image generation apparatus 200 may initialize the support vector s to $0_{PR}$.

The radar image generation apparatus 200 may compute the support update matrix μ(s) by activating a single element of the support vector s in the $l^{th}$ radar 100-1 and may transfer the computed support update matrix μ(s) to a reference radar, for example, the radar 100-1 that is the first radar.

The radar image generation apparatus 200 may compute a support update matrix $\mu^{(1)}(s_k)$ as $$\mu^{(1)}(s_k) = \sum_{l=1}^{L} \mu^{(1,l)}(s_k)$$

at the reference radar, for example, the radar 100-1 and may store a support vector $e_k$ associated with a D largest support update matrix $\mu^{(1)}(s_k)$ in a support vector set $\overline{S}^{(1)}$.

The radar image generation apparatus 200 may share the support vector set $\overline{S}^{(1)}$ with other radars.

The radar image generation apparatus 200 may construct a subsequent candidate support vector set $S^{(2)}$ at each radar.

The radar image generation apparatus 200 may compute a support update matrix $\mu^{(2,l)}(s_k)$ about a support vector set $s_k \in S^{(2)}$ included in the support vector set $S^{(2)}$ and may transfer the computed support update matrix $\mu^{(2,l)}(s_k)$ to the reference radar.

The radar image generation apparatus 200 may iterate the aforementioned operation until an I element of the support vector s is activated.

The radar image generation apparatus 200 may compute the magnitude coefficient $x^{(l)}$ of the $l^{th}$ radar 100-1 through coefficient update, as represented as Equation 27.

$$\hat{x}^{(l)} = \arg\max_x \sum p(x | y^{(l)}) = \arg\max_x \sum p(x | y^{(l)}, s) p(s | y^{(l)}) \quad \text{[Equation 27]}$$

The radar image generation apparatus 200 may compute a magnitude coefficient $x^{(l)}$ as represented as Equation 28.

$$\hat{x}^{(l)} = \arg\max_{\overline{A}_s^{(l)}} \Sigma p(x|y^{(l)}, \overline{s}) = (\sigma_n^2 R^{-1}(\overline{s}) + (\overline{A}_s^{(l)})^H \overline{A}_s^{(l)})^{-1} (\overline{A}_s^{(l)})^H y^{(l)} \quad \text{[Equation 28]}$$

Here, a support vector $\overline{s}$ may be associated with a D largest support update matrix $$\mu^{(i)}(s_k) \left( \sum_{l=1}^{L} \mu^{(i,l)}(s_k) \right)$$

for a support vector $s_k \in \overline{S}^{(l)}$ at an $i^{th}$ iteration and $\overline{A}_s^{(l)} = \overline{A}^{(l)} \text{diag } \overline{s}.$ The radar image generation apparatus 200 may partially update the magnitude coefficient $x^{(l)}$ at the $l^{th}$ radar 100-1. In contrast, a support vector set $\overline{S}^{(l)}$ may be overall updated by exchanging the support vector associated with a D largest value of the support update matrix $\mu^{(i,l)}(s_k)$.

When an update process is terminated at the $i^{th}$ iteration, the radar image generation apparatus 200 may transfer the partially optimized magnitude coefficient $\hat{x}^{(l)}$ to the reference radar and may acquire a refined radar image as represented as Equation 29.

$$\hat{x} = \sum_{l=1}^{L} \alpha_l \hat{x}^{(l)} \quad \text{[Equation 29]}$$

Here, $$\alpha_l = \frac{\mu^{(i,l)}(\overline{s})}{\sum_{l=1}^{L} \mu^{(i,l)}(\overline{s})}.$$

That is, x of Equation 29 may represent a weighted sum of $\hat{x}^{(l)}$ estimated based on a likelihood metric.

The radar image generation operation of applying the distributed compression sensing algorithm, for example, DBMP, using the radar image generation apparatus 200 may be summarized as FIG. 6 and Algorithm 2 of FIG. 7.

The DBSC (Algorithm 2) of the radar image generation apparatus 200 may require information exchange between distributed radars during the progress of an iteration. For example, the $l^{th}$ radar 100-1 may transfer a support vector associated with a scalar metric $\mu^{(i,l)}(s_k^{(l)})$ about possible DPR candidates that occupy the majority of the entire information exchange amount.

The radar image generation apparatus 200 may transfer a D support vector of the support vector set $\overline{S}^{(l)}$ of the $l^{th}$ radar 100-1 to another radar 100. Here, the radar image generation apparatus 200 may transfer an update element index of a related support vector or may not transfer the related support vector.

FIGS. 8A to 8E illustrate examples of comparing a radar image generated by the radar image generation apparatus of FIG. 2 and a radar image generated using another method.

Figure 8A:
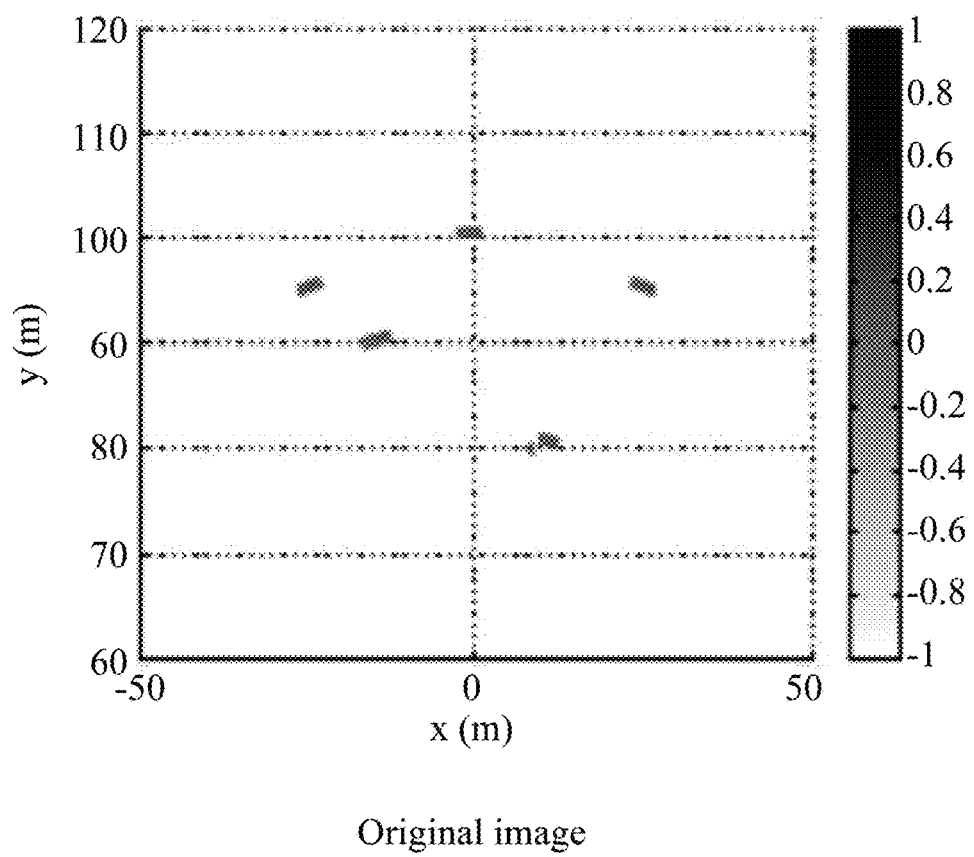
FIGS. 8A to 8E illustrate examples of comparing a radar image generated by the radar image generation apparatus of FIG. 2 and a radar image generated using another method.

FIG. 8A illustrates an example of an original image and an environment in which five vehicles are present in front.

Figure 8B:
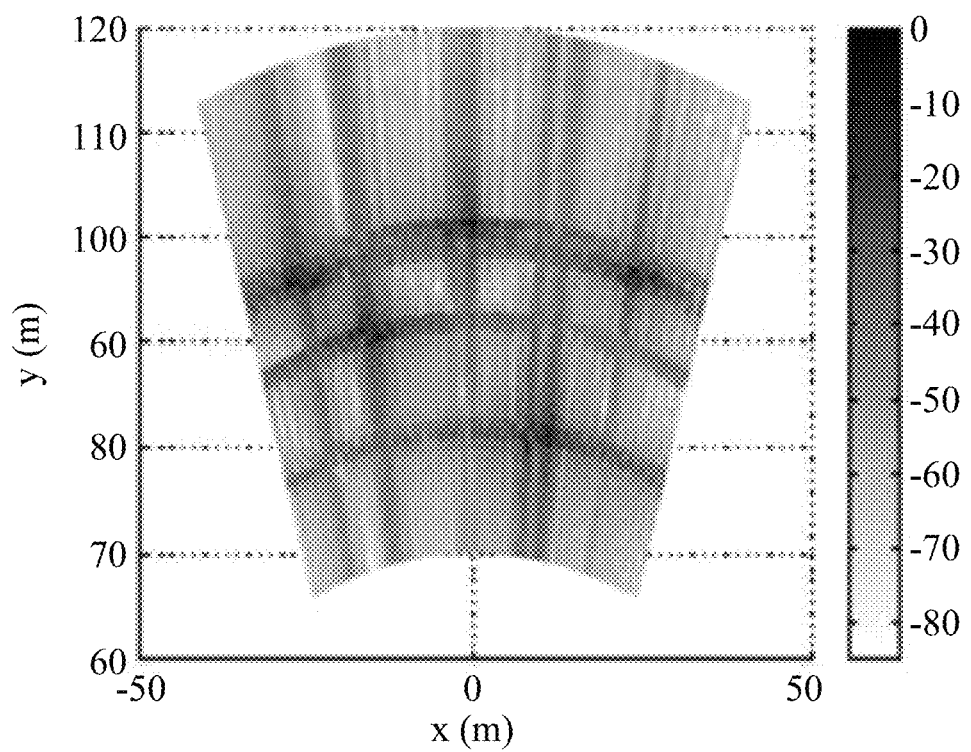

FIG. 8B illustrates an example of a radar image acquired using a back-projection method. Here, many afterimages are present around a target.

Figure 8C:
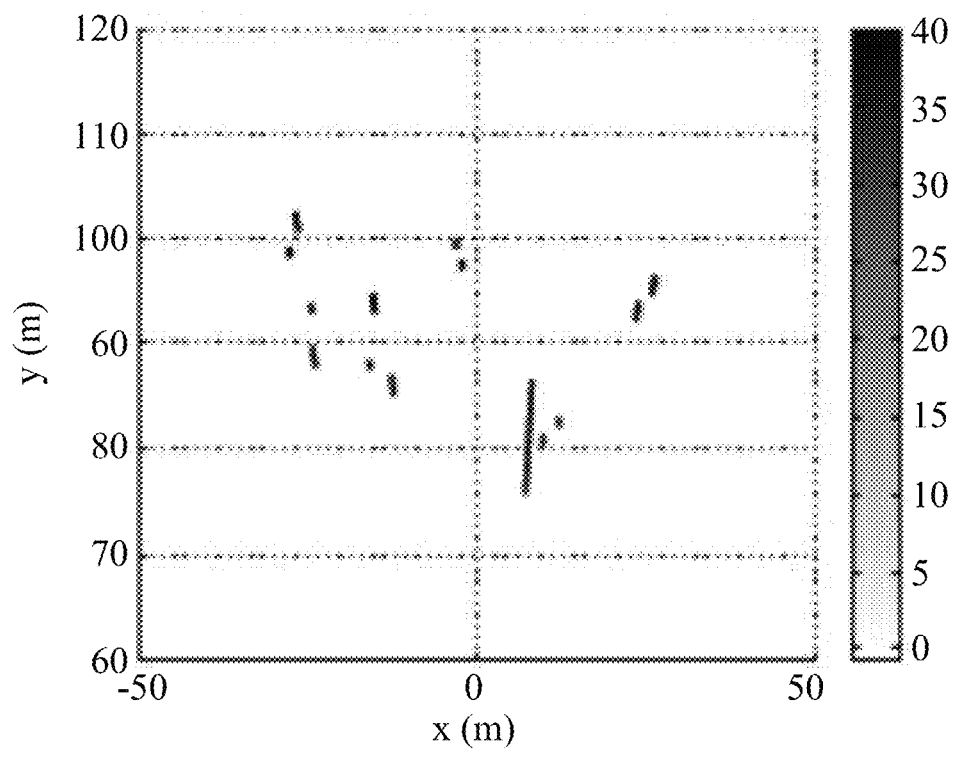

FIG. 8C illustrates an example of a radar image acquired using an orthogonal matching pursuit (OMP) method. It can be verified that ghost targets are focused on an image.

Figure 8D:
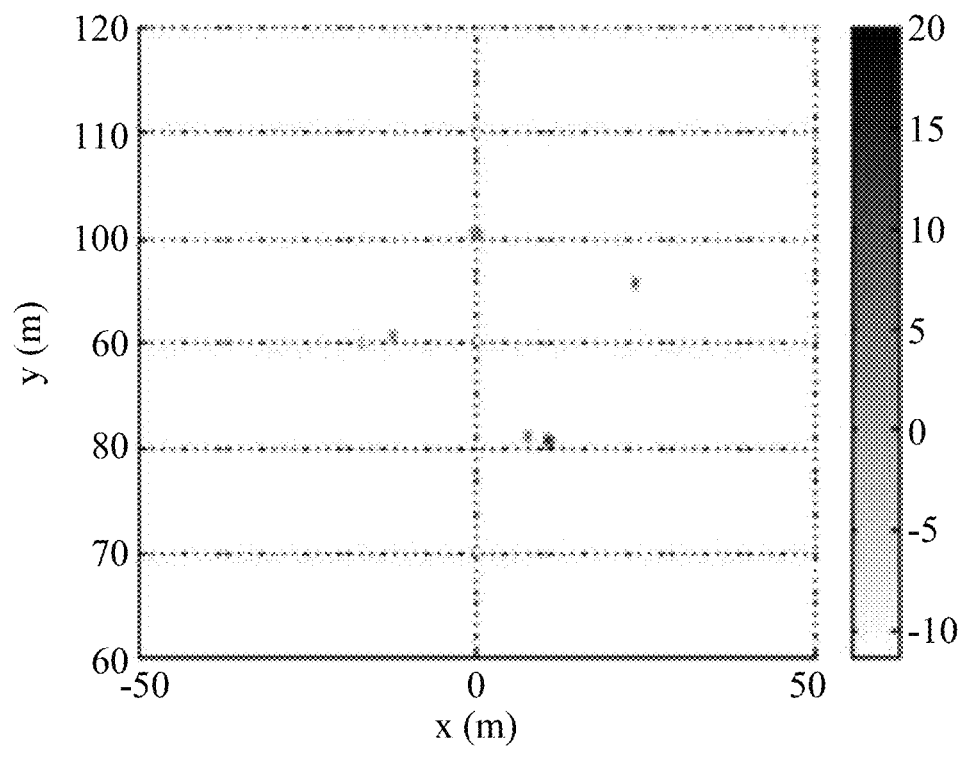
Figure 8E:
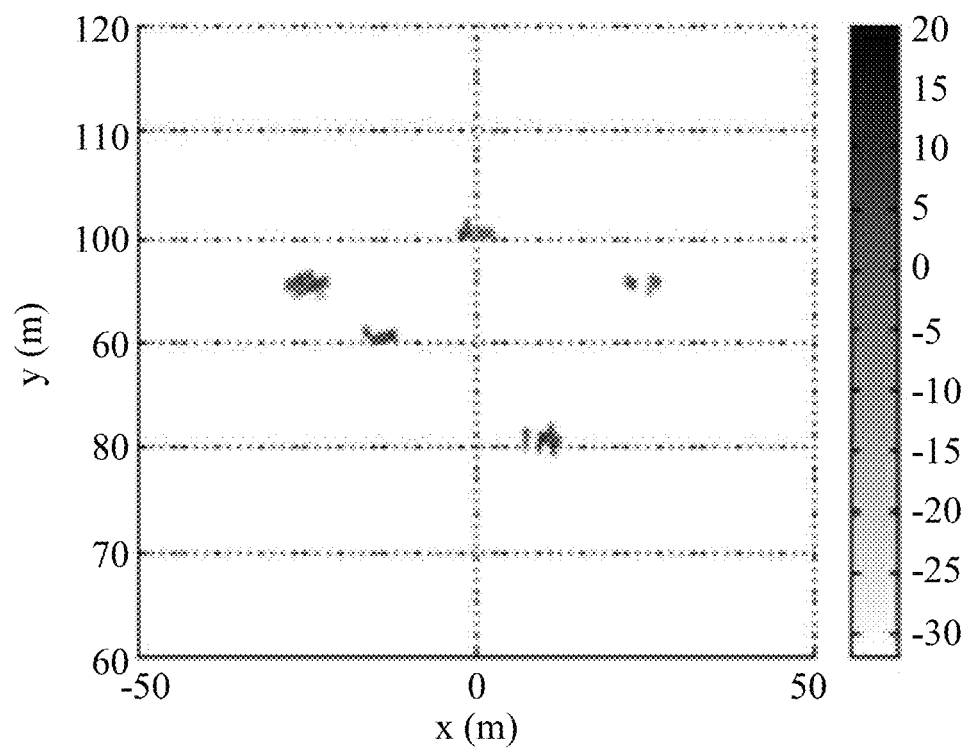

FIG. 8D illustrates an example of a radar image acquired through a compression sensing algorithm, for example, BMP, using the radar image generation apparatus 200. It can be verified that a clean image is acquired for targets of the original image.

8E illustrates an example of a radar image acquired through a distributed compression sensing algorithm, for example, DBMP, for a signal acquired from a distributed radar of the radar image generation apparatus 200. It can be verified that an image closest to the original image is acquired.

Figure 9:
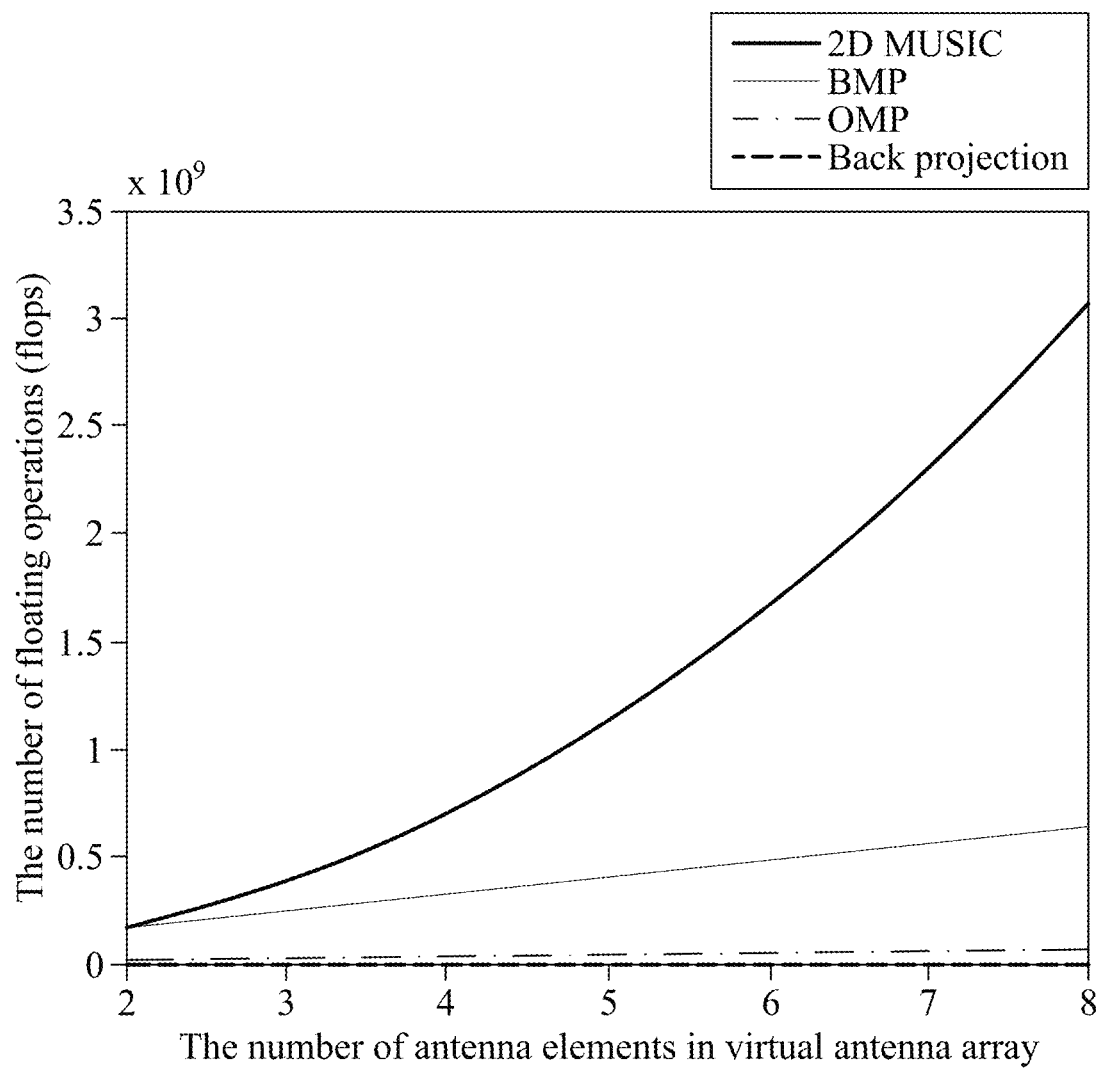
FIG. 9 is a graph showing an example of comparing a number of floating operations among radar image generation methods.

FIG. 9 is a graph showing an example of comparing a number of floating operations (flops) among radar image generation methods.

A computation amount used to acquire an image is compared among an existing 2D MUSIC method, an OMP method, a compression sensing algorithm, for example, BMP, and a back-projection method. Referring to the graph of FIG. 9, as a number of antennas increases, a number of floating operations (flops) increases. Compared to the existing 2D MUSIC, a radar image acquisition operation using the BMP of the radar image generation apparatus 200 requires the number of floating operations by six times less.

The components described in the example embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments of the present invention may be achieved by software, and the software may be recorded on a recording medium. The components, the functions, and the processes described in the example embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A radar image generation method comprising:
receiving a received signal received at each of radars that are distributed and arranged;
generating an input signal by processing the received signal;

generating a support vector that represents sparsity for sparsity modeling based on the input signal;
updating the support vector;
updating a coefficient corresponding to the support vector; and
generating a radar image based on the support vector and the coefficient,
wherein the generating of the input signal comprises:
generating a first de-ramped signal by de-ramping the received signal;
generating a second de-ramped signal by processing the first de-ramped signal; and
reformulating the second de-ramped signal based on a measurement area,
wherein the updating of the support vector comprises computing a support update matrix for updating the support vector,
wherein the computing of the support update matrix comprises initializing the support vector.

2. The radar image generation method of claim 1, wherein the measurement area is divided in a two-dimensional (2D) patch form with respect to a distance and an azimuth.

3. The radar image generation method of claim 1, wherein the coefficient is a total sum of an antenna gain and a pathloss of a radar.

4. The radar image generation method of claim 1, wherein the updating of the support vector further comprises:
sharing a support vector set that is updated based on the support update matrix.

5. The radar image generation method of claim 4, wherein the computing of the support update matrix further comprises:
computing the support update matrix by activating a single element of the support vector.

6. The radar image generation method of claim 4, wherein the sharing of the support vector set comprises:
updating the support vector set based on a total sum of the support update matrix; and
sharing the updated support vector set.

7. The radar image generation method of claim 6, wherein the updating of the support vector set comprises storing a support vector associated with a maximum value of the total sum in the support vector set.

8. The radar image generation method of claim 1, wherein the updating of the coefficient comprises:
computing the coefficient based on the updated support vector; and
verifying whether an estimation error is less than a threshold based on the coefficient.

9. A radar image generation apparatus comprising:
a memory configured to store instructions; and
a processor configured to execute the instructions,
wherein, when the instructions are executed by the processor, the processor is configured to receive a received signal received at each of radars that are distributed and arranged, to generate an input signal by processing the received signal, to generate a support vector that represents sparsity for sparsity modeling based on the input signal, to update the support vector, to update a coefficient corresponding to the support vector, and to generate a radar image based on the support vector and the coefficient,
wherein the processor is configured to generate a first de-ramped signal by de-ramping the received signal, to generate a second de-ramped signal by processing the first de-ramped signal, and to reformulate the second de-ramped signal based on a measurement area,
wherein the updating of the support vector comprises computing a support update matrix for updating the support vector,
wherein the computing of the support update matrix comprises initializing the support vector.

10. The radar image generation apparatus of claim 9, wherein the measurement area is divided in a two-dimensional (2D) patch form with respect to a distance and an azimuth.

11. The radar image generation apparatus of claim 9, wherein the coefficient is a total sum of an antenna gain and a pathloss of a radar.

12. The radar image generation apparatus of claim 11, wherein the processor is further configured to share a support vector set that is updated based on the support update matrix.

13. The radar image generation apparatus of claim 12, wherein the processor is further configured to compute the support update matrix by activating a single element of the support vector.

14. The radar image generation apparatus of claim 12, wherein the processor is configured to update the support vector set based on a total sum of the support update matrix, and to share the updated support vector set.

15. The radar image generation apparatus of claim 14, wherein the processor is configured to store a support vector associated with a maximum value of the total sum in the support vector set.

16. The radar image generation apparatus of claim 9, wherein the processor is configured to compute the coefficient based on the updated support vector, and to verify whether an estimation error is less than a threshold based on the coefficient.

17. A radar system comprising:
a plurality of radars each comprising a plurality of transmit antennas and a plurality of receive antennas; and
a radar image generation apparatus of claim 7.

18. The radar system of claim 17, wherein the plurality of radars are provided at distributed positions.

* * * * *